C. A. LAMONT.
APPARATUS FOR DESICCATING EGGS.

No. 50,421. Patented Oct. 10, 1865.

Witnesses
Louis R. McLain
Gilbert B. Fowles

Inventor
Charles A. Lamont
By David A. Burr
atty

UNITED STATES PATENT OFFICE.

CHAS. A. LAMONT, OF NEW YORK, N. Y., ASSIGNOR TO HIMSELF AND DAVID A. BURR, OF WASHINGTON, DISTRICT OF COLUMBIA.

IMPROVED APPARATUS FOR DESICCATING EGGS.

Specification forming part of Letters Patent No. 50,421, dated October 10, 1865.

*To all whom it may concern:*

Be it known that I, CHARLES A. LAMONT, of New York city, in the county and State of New York, have invented a new and useful Apparatus for Desiccating Eggs; and I do hereby declare that the following is a full, clear, and exact description thereof, reference being had to the accompanying drawings, forming a part of this specification, in which—

Figure 1:
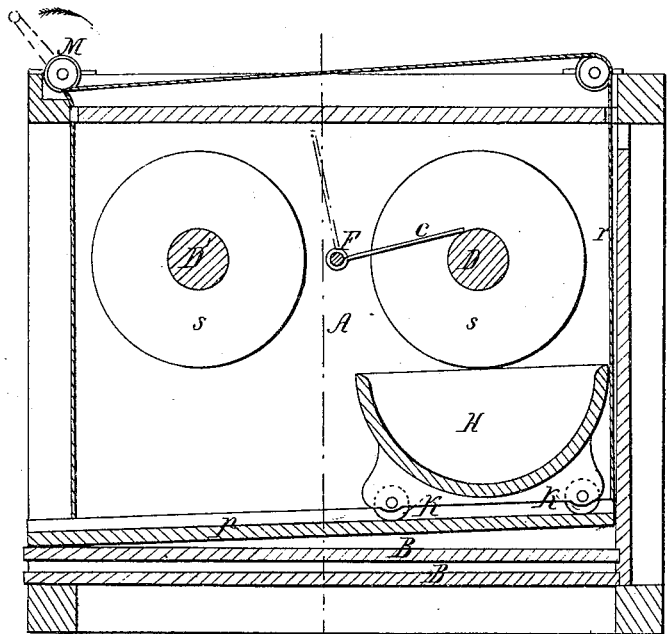
Figure 2:
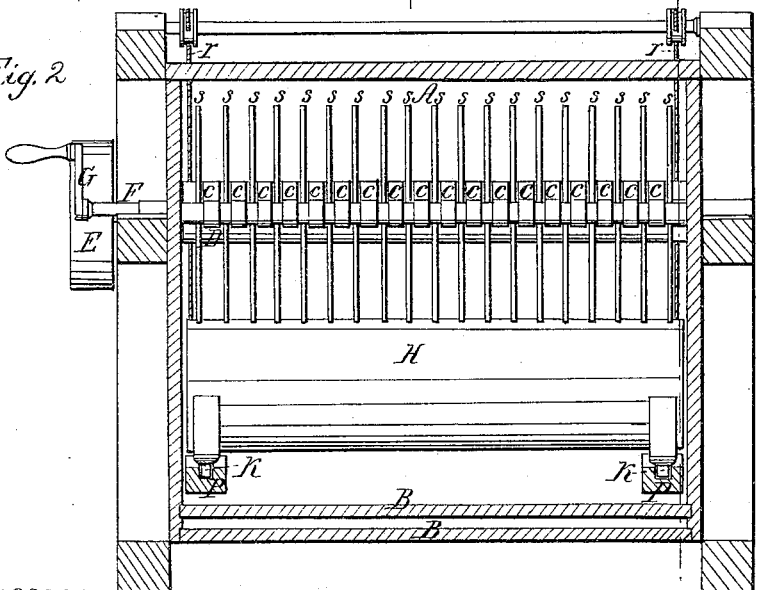

Figure 1 is a vertical section through my said apparatus in the line $x\ x$ of Fig. 2, and Fig. 2 a similar section in the line $y\ y$ of Fig. 1.

Similar letters indicate like parts in each of the figures.

Heretofore the desiccation of eggs has been effected by exposing the substance thereof in shallow pans to currents of heated air; but with this process it has been found almost impossible to cure the eggs properly and retain their natural flavor and quality untainted, because of the difficulty of obtaining an even thickness or depth of the eggy matter in the pans and of drying the same uniformly and in thin and even layers. Attempts have been made to improve upon this system of using stationary pans by dipping thin plates into the egg and then placing them in a revolving frame to dry. This plan, although promising more satisfactory results, was found impracticable, not only because of the labor and trouble required to first dip the plates and then transfer them to the frame-work made to receive them, but also because it was found impossible to dip and transfer a number of plates quickly enough to retain a sufficient coating of egg thereon. By my invention, however, I have perfected an apparatus which will rapidly and completely desiccate the eggs without liability to any of the objections heretofore encountered.

The nature of my invention consists in arranging the drying-plates upon a central revolving shaft with their edges projecting radially therefrom, and so combining therewith a supplying or dipping trough as that they may be dipped therein when in revolution; and also in the combination of a series of scraping-blades with the drying-plates to remove the hardened egg therefrom.

I inclose my apparatus within a suitable desiccating-chamber, A.

The desiccating-chamber A is constructed and ventilated in the usual manner, and heated by powerful currents of hot air or steam to a temperature of about 120°. It is provided with double sliding bottoms B B, to facilitate the ready removal of the desiccated egg or other matter prepared in the apparatus, and its front end is so arranged as to admit ready access to the supplying trough or vat H.

In the upper part of the chamber two or more parallel shafts, D D′, are placed, and made to revolve with suitable velocity by means of pulleys E, Fig. 2, upon their outer ends, which are connected by bands with a driving-shaft. A series of thin circular metallic plates, $s\ s\ s\ s\ s$, of a diameter which may properly be about two-thirds greater than that of the shaft, are arranged and secured at narrow but regular intervals along the entire length of each of the shafts D D′, as seen in Fig. 2. Midway between each set of the plates upon these shafts D D′, and parallel thereto, is placed a rod or rocker-shaft, F, upon which are secured a series of fingers or scraping-blades, $c\ c\ c\ c$, each equal in width to the intervals between the circular plates $s\ s\ s\ s$ upon the shafts D D′, so that they may enter and fit accurately between the said plates, and of such a length as to reach the center of the shafts on either side. This scraper-rod F terminates outwardly in a crank, G, (seen in Fig. 2,) where the fingers $c\ c\ c\ c$ may be thrown over from the one shaft, D, to the other shaft, D′, or vice versa, at pleasure. It is also so arranged in its bearings as to have a slight longitudinal play, whereby the edges of the scraping-blades may be severally brought to bear against either face of each of the circular drying-plates $s\ s\ s\ s$ to remove thoroughly and effectually the accretions thereon. The position of this rocker-shaft F may be changed by placing it higher and near the roof of the chamber A, provided its scraping-blades are made long enough to extend to the center of the drying-plates $s\ s\ s\ s$. In this case the shafts D D′ may be brought nearer together.

In the lower portion of the desiccating-chamber A, beneath the drying-plates $s\ s$, and parallel to their shafts D D′, is placed the supplying vat or trough H, which contains the substance of the eggs to be desiccated. This trough or vat is of a semicircular section, as seen in Fig. 1, of a diameter somewhat greater than that of the circular drying-plates, and is furnished with suitable wheels, K K, at either end thereof, so as to run freely in ways $p\,p$ provided therefor on either side of the chamber, as seen in Fig. 2 of the drawings. These ways $p\,p$ are suspended at each end by means of cords $r\,r$ passing over pulleys arranged upon shafts on the top of the apparatus. The ends of the rear cords are brought forward and secured with the ends of the front cords to the perimeter of the front pulleys, as illustrated in Fig. 1, so that the revolution of the front pulleys, M M, in the direction indicated by the arrow in the drawings will first slightly elevate the rear ends of the ways $p\,p$ before commencing to elevate the front ends also; and their revolution in the opposite direction will incline these ways from front to rear before acting evenly on both ends to draw them up together. By continuing to turn the shaft and pulleys M M in either direction, the ways, being first inclined, will be drawn up so as to bring the trough up under one of the drying-shafts D D' until the plates $s\,s\,s\,s$ thereon become partially immersed and by their revolution wholly dipped in its contents. So soon as the plates are thus dipped trough or vat is let down and run forward or backward to the next series of plates. A tongue is formed upon the inner side of the ends of each of the suspended ways $r\,r$, which, fitting loosely in a vertical groove or slot cut to receive it in the side of the chamber, prevents a swinging motion of the way.

The vat H may be arrested in the required central position immediately beneath each drying-shaft D D' and its plates $s\,s\,s$ by means of any suitable system of spring-catches arranged in the sides of the chamber.

When the apparatus is ready for use and the chamber properly heated, the drying-plates $s\,s\,s\,s$ are put into revolution by connecting their shafts D D' with the driving-power, and the vat H, filled with the substance of the eggs to be desiccated, is placed under the first series of drying-plates and quickly elevated by turning the pulley-shaft and pulleys M M and winding up thereon the cords by which the ways $r\,r$ sustaining the vat are suspended. These plates $s\,s\,s$, dipping in the egg, will in one or two revolutions be coated therewith. The vat is now let down again, and the spring-catch, which here held it, being released, it will run down the inclined way until arrested by the next catch under the next series of drying-plates, where it is again to be elevated for the purpose of dipping them, as in the first instance. Thus each series of plates are successively dipped and left to dry. When the vat H has thus run down to the rear end of the chamber, a reverse movement of the pulleys M M in the direction indicated by the arrow in Fig. 1 will serve to elevate the rear ends of the ways sufficiently to incline them in the opposite direction, so that whenever released the vat H will run back toward the front. In the meantime the eggy substance, so soon as it dries upon the plates $s\,s\,s$, may be immediately removed therefrom by the scraping-blades $c\,c\,c$, (which are thrown over from one series of drying-plates to the other by the crank G, Fig. 2,) and will fall in its desiccated condition upon the movable plate B, forming the bottom of the chamber.

I contemplate any suitable means of adjusting the ways $r\,r$, upon which the vat H is supported in my desiccating apparatus, not limiting myself to the use of cords and pulleys alone.

My improved apparatus may be used equally well for desiccating the albumen or the yolk of eggs separately as well as together, and for other substances than eggs.

Having thus fully described my invention, what I claim therein as new, and desire to secure by Letters Patent, is—

1. The within-described mode of desiccating eggs by the use, in combination with a dipping trough or vat, H, of one or more drying-plates, $s\,s$, secured upon a central revolving shaft, D, substantially in the manner herein set forth.

2. The use of one or more scraping-blades, $c\,c$, in combination with the revolving plates of an egg-desiccating apparatus, substantially as and for the purpose herein set forth.

3. Supporting the movable supplying-trough H of my improved egg-desiccating apparatus upon adjustable ways $r\,r$, so arranged as to operate substantially in the manner and for the purpose herein set forth.

CHAS. A. LAMONT.

Witnesses:
DAVID A. BURR,
LOUIS R. McLAIN.